United States Patent [19]

Doris et al.

[11] Patent Number: 5,383,354
[45] Date of Patent: Jan. 24, 1995

[54] PROCESS FOR MEASURING SURFACE TOPOGRAPHY USING ATOMIC FORCE MICROSCOPY

[75] Inventors: Bruce B. Doris; Rama I. Hegde, both of Austin, Tex.

[73] Assignee: Motorola, Inc., Schaumburg, Ill.

[21] Appl. No.: 172,974

[22] Filed: Dec. 27, 1993

[51] Int. Cl.6 .............................................. G01B 5/28
[52] U.S. Cl. .................................................. 73/105
[58] Field of Search ................... 250/306, 307; 73/105

[56] References Cited

U.S. PATENT DOCUMENTS

| | | | |
|---|---|---|---|
| 4,943,720 | 7/1990 | Jones | 250/306 |
| 5,010,249 | 4/1991 | Nishikawa | 250/306 |
| 5,047,649 | 9/1991 | Hodgson et al. | 250/307 |
| 5,051,379 | 9/1991 | Bayer et al. | 250/307 |
| 5,066,358 | 11/1991 | Quate et al. | 250/306 |
| 5,120,959 | 6/1992 | Tomita | 250/306 |
| 5,171,992 | 12/1992 | Clabes et al. | 250/306 |
| 5,182,452 | 1/1993 | Niwa et al. | 250/307 |
| 5,266,801 | 11/1993 | Elings et al. | 250/307 |
| 5,272,913 | 12/1993 | Toda et al. | 73/105 |

FOREIGN PATENT DOCUMENTS

| | | | |
|---|---|---|---|
| 2535912 | 2/1977 | Germany | 73/105 |
| 132903 | 5/1989 | Japan | 250/306 |
| 223606 | 10/1991 | Japan | 250/306 |
| 2083229 | 4/1982 | United Kingdom | 73/105 |

OTHER PUBLICATIONS

Mariko Yamaki et al., "Efficient microtip fabrication with carbon coating and electron beam deposition for atomic force microscopy", J. Vac. Science Tech., Nov./Dec. '92, vol. 10, No. 6, Part B, pp. 2447–2450.

David Keller et al., "Sharp, vertical-walled tips for SFM imaging of steep or soft samples", Ultramicroscopy vol. 42–44, Part B, Jul. 1992, pp. 1481–1489.

Heinz H. Busta, "Novel Applications Employing LPCVD Tungsten", CVD Tungsten Tech., Oct. 6, 1987 Continuing Education In Engineering, Univ. Extension, Univ. of California, Berkeley, pp. 1–30.

Primary Examiner—Hezron E. Williams
Assistant Examiner—Daniel S. Larkin
Attorney, Agent, or Firm—Patricia S. Goddard

[57] ABSTRACT

Accuracy and repeatability of atomic force microscopy (AFM) are improved by coating a single crystal silicon probe tip with a layer of carbon. The carbon-coated probe tip is brought into contact with a specimen surface, and is scanned across the area of interest. The carbon coating improves the interaction between the probe tip and specimen surface, particularly insulating surfaces, by reducing probe tip damage and minimizing charge build-up.

28 Claims, 1 Drawing Sheet

PROCESS FOR MEASURING SURFACE TOPOGRAPHY USING ATOMIC FORCE MICROSCOPY

FIELD OF THE INVENTION

The present invention relates generally to processes for measuring surface topography, and more specifically to scanning processes using atomic force microscopy.

BACKGROUND OF THE INVENTION

Atomic force microscopy (AFM) is a technique for measuring surface topography. AFM typically relies on repulsive forces between a specimen substrate and an AFM probe tip to detect extremely small surface variations. To measure topography of a particular surface, the probe tip, which is fabricated at the end of a cantilever, is brought into contact with the surface and is scanned over a predetermined area of the surface. The deflection of the cantilever is measured (e.g. by a laser beam and photodetector or interferometer) and is correlated to heights of surface features. This information is electronically recorded as a topographical image of the scanned area.

There are two different prevalent modes of operation for AFM, namely contact mode and tapping mode (also referred to as TappingMode ™ which is a trademark of Digital Instruments). In the contact mode, a probe tip is brought into contact with the surface to be scanned and remains pressed against the surface throughout the entire scanning procedure. However, when measuring surfaces of certain materials, particularly insulating materials, the contact mode often fails to provide an accurate representation of the surface and is not repeatable. In the contact mode, the probe tip is more or less rubbed across the surface, creating frictional and shearing forces that damage the AFM probe tip as well as the sample under investigation. Therefore, a generated image of a surface topography may not accurately depict the actual specimen surface.

One attempt to solve the problem of the interaction between the probe tip and the specimen surface is to use the tapping mode. In the tapping mode, rather than keeping the probe tip constantly in contact with the specimen surface, the probe tip is repeatedly and continuously tapped against the surface during the scanning process. The cantilever and integral tip are oscillated at the cantilever's fundamental frequency. The tip is brought into contact with the surface, thereby damping the amplitude of the cantilever's oscillation. The amount of damping is held constant with a feedback loop by moving the tip and lever or the sample up or down as the tip traces the surface topography. The distance which the lever and tip or sample is moved in order to keep the damping constant is recorded and is directly related to heights of surface features. In this way, topography of the sample is measured. Because the tapping mode eliminates the constant rubbing, which produces frictional and shearing forces between the probe tip and the specimen characteristic of the contact mode, it was initially believed that the resulting images would be better representative of the actual specimen surface.

However, even in the tapping mode, reproducibility and accuracy of the AFM scan is often lacking. Therefore, a need exists for an improved method for using AFM to measure surface topography. Such a method would be beneficial in numerous AFM applications. One application in particular would be measuring the quality and integrity of thin films, such as gate oxides, in semiconductor devices.

SUMMARY OF THE INVENTION

In accordance with one embodiment of the present invention, topography of a surface is measured using an atomic force microscopy method. The method involves the following steps: providing a specimen having a surface; providing an atomic force microscopy probe having a probe tip which is coated with a carbon film; bringing the carbon coated probe tip into contact with the surface of the specimen; and scanning the surface with the probe tip to generate an image of the surface topography.

These and other features, and advantages, will be more clearly understood from the following detailed description taken in conjunction with the accompanying drawings. It is important to point out that the illustrations may not necessarily be drawn to scale, and that there may be other embodiments of the present invention which are not specifically illustrated.

DETAILED DESCRIPTION OF A PREFERRED EMBODIMENT

As discussed in the background, both the existing contact and tapping modes used in AFM have problems related to reproducibility and accuracy of the image resulting from a scan. As an example, a tapping mode scan was performed over a 1 μm square area of an $SiO_2$ layer surface deposited on a semiconductor substrate. The scan was performed using a commercially available AFM probe having a single crystal silicon probe tip. At the beginning of the scan (across a bottom portion of the scanned area), the root mean square (RMS) roughness of the specimen was 2.09 Å (0.209 nm), whereas the RMS roughness at the end of the scan (across a comparable top portion of the scanned area) was 0.50 Å (0.050 nm). As mentioned herein, RMS is defined or measured as the root mean square of the deviations of the surface from a calculated mean reference surface. Yet, there was no actual variation between the top and bottom portions of the scanned area. Thus, the top-to-bottom RMS differential is due to a variable in the scanning process itself.

Figure 1:
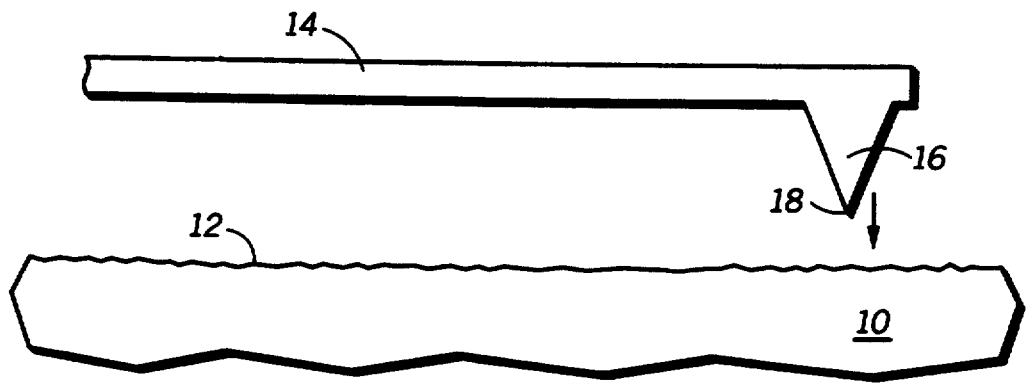
FIG. 1 is a cross-sectional view of a prior art technique for measuring surface topography.
Figure 2:
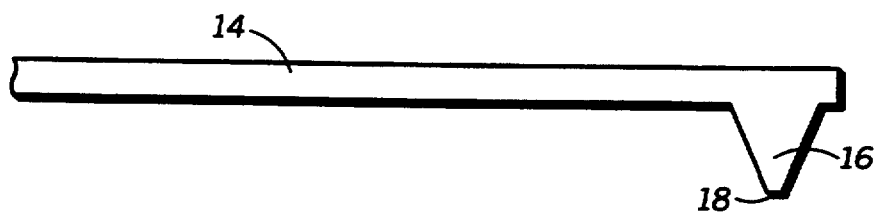
FIG. 2 is a cross-sectional view of a prior art probe tip blunted as a result of measuring the topography of a surface.

The source of the variation was found to lie in the probe tip. Before beginning a scan, the probe tip used is very pointed in order to be able to measure the fine detail of surfaces at an atomic level. An example of a typical probe tip is illustrated in FIG. 1. FIG. 1 includes a specimen or substrate 10 having surface 12 which is to be measured using AFM. A probe cantilever 14 is positioned over the specimen and includes an integral probe tip 16 having an apex 18. Commercially available probe tips are typically either made of single crystal silicon or of silicon nitride, and have a diameter at apex 18 of approximately 200 Å (20 nm). After the probe tip is brought into contact with the specimen and is scanned, either in the contact mode or the tapping mode, the probe tip becomes blunted, as illustrated in FIG. 2. Over a 1 μm area scanned as described above, the diameter of probe tips at the end of the scan was between approximately 1000 Å and 3000 Å (100–300 nm).

Such blunting or any other type of degradation in the probe tip shape adversely impacts the accuracy of the resulting image. For example, as the diameter of the probe tip widens, many measured variations of the specimen surface are really being produced by the tip rather than by the surface. For example, if a feature size on a surface has a lateral dimension, a probe tip having a diameter of more than half that lateral dimension will be unable to accurately measure the surface feature dimensions. Accordingly, it is desirable to maintain a constant probe tip dimension throughout an entire scan and also to keep the tip sharp enough to be able to measure surface features.

Figure 3:
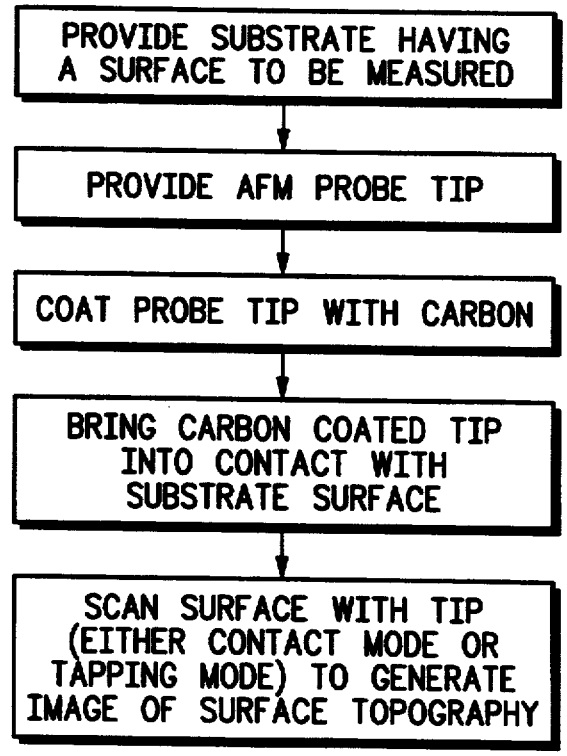
FIG. 3 is a process flow in accordance with the present invention.

In accordance with the present invention, the accuracy and reproducibility problems addressed above are overcome by using a modified probe tip. FIG. 3 is a flow chart demonstrating one embodiment of practicing the present invention. First, a specimen having a surface to be measured using AFM is provided. Any type of specimen may be measured in accordance with the present invention. As one example, the specimen may be a semiconductor substrate such as a silicon or other semiconductor wafer. Furthermore, the specimen may include various layers, the outermost of which is to be measured using AFM. For example, a semiconductor substrate may have an overlying thin film dielectric or insulating layer, such as an $SiO_2$ gate oxide or a capacitor dielectric. The inventive process can also be used on conductive films, layers, or substrates. Furthermore, the invention may be used to measure patterned features on a substrate.

Next an AFM probe and probe tip are provided. Commercially available AFM probes are suitable for practicing the present invention. Likewise, commercially available probe tips, particularly single crystal silicon tips and also silicon nitride tips, may be used. However, in accordance with the present invention a probe tip is modified, in comparison to prior art probe tips, by coating the probe tip with a film or layer of carbon. In a preferred form, the cantilever with the integral probe tip is placed in a traditional bell jar evaporator having a carbon rod. Deposition within the bell jar lasts for about 5 seconds to 30 seconds, resulting in a carbon thickness of between approximately 100 Å to 3000 Å (10–300 nm) being deposited on both the tip and cantilever. For the purposes of the present invention, achieving a carbon coating on the probe tip is important while deposition of the cantilever itself is an unnecessary consequence of the deposition. It should also be understood that other methods for coating the probe tip may be used in place of bell jar evaporation. For example, the carbon coating may be chemically vapor deposited or sputtered onto the probe tip. The bell jar evaporation technique is preferred because it is inexpensive, quick, and very easy to perform. While in the future, carbon coated probe tips may be commercially available, at present the commercially available silicon and silicon nitride probe tips are likely to be carbon coated "in-house" by an AFM user. Since bell jar evaporators are prevalent, this method of carbon coating is readily available to AFM users. However, other coating techniques may be preferred by suppliers of the probe tips. Furthermore, the invention is not limited to the evaporation times or carbon film thickness described.

Once the probe tip is coated with carbon, the tip is brought into contact with the specimen such that the carbon coating itself contacts the specimen surface. It should be noted that bringing the actual carbon coating into contact with the specimen is different from techniques which employ electron beam deposited (EBD) microtips. EBD tips start as the commercially available silicon or silicon nitride probe tips describe above. However, the commercially available tips are then modified by depositing or growing a much finer tip, called a microtip, at the end of the commercial probe tip using electron beam deposition. EBD microtips were developed primarily to enable AFM measurements of vertical walls or very step topographies within a specimen. In order to measure such topographies, a tip which is longer and narrower than the commercially available silicon or silicon nitride probe tips was required, resulting in the development of EBD microtips. To enhance the deposition characteristics of EBD microtips, it is known to first coat a silicon nitride probe tip with carbon prior to depositing the EBD microtip. (See "Efficient Microtip Fabrication with Carbon Coating and Electron Beam Deposition for Atomic Force Microscopy," by M. Yamaki et al., Journal of Vacuum Science Technology November/December 1992, Vol. 10, No. 6, Part B, pp. 2447–2450.) The purpose of coating the probe tip with carbon in the EBD microtip fabrication application is to enhance the growth characteristics of the EBD microtip while the tip is grown in a scanning electron microscope (SEM). However, in the present invention the purpose and function of the carbon layer is quite different. A carbon coating as used in the present invention serves to protect both the probe tip and specimen surface during the actual scanning operation. Furthermore, a carbon coating in accordance with the present invention reduces unwanted interactions between the probe tip and specimen surface, such as excess charge build-up. Moreover, the prior art carbon coating used on probe tips never comes into contact with the specimen surface, rather the EBD microtip contacts the surface. In the prior art, carbon coatings were used to enhance EBD microtip fabrication, whereas the present invention utilizes a carbon coating which actually improves the AFM measuring technique.

After the specimen is initially contacted by the carbon coated probe tip, the specimen surface is scanned by any one of several AFM techniques, such as the contact mode and tapping mode described above. The present invention is advantageous for use in either mode because the carbon coating beneficially affects the interaction between the probe tip and the specimen surface. The carbon coated probe tip also reduces damage to the probe tip and to the specimen surface during scanning by providing a protective tip coating. Moreover, this coating reduces excessive charge build-up during the scan so that the present invention achieves a higher degree of accuracy and reproducibility than prior art AFM techniques.

Advantages of practicing the present invention are evident in comparing the RMS of a scanned 1 μm square area of an $SiO_2$ surface deposited on a silicon wafer both with and without a carbon coated probe tip. As previously mentioned, an uncoated silicon probe tip had an RMS roughness of 2.09 Å (0.209 nm) at the bottom of a control sample area but an RMS roughness of 0.50 Å (0.050 nm) at the top of the control sample area. In using a carbon coated silicon probe tip in accordance with the present invention, the RMS roughness at the bottom of the same control sample area was 2.07 Å (0.207 nm), while the RMS roughness at the top of control sample area was 2.03 Å (0.203 nm). Therefore, it is apparent that in practicing the present, the variation from top-to-bottom of a scan is drastically reduced. It is also apparent that measurements taking with prior art techniques are unreliable in that final surface analysis may improperly incorporate factors other than the surface topography, such as erroneous readings due to probe tip damage or unwanted interaction with the surface. Accordingly, practicing the present invention results in much more accurate analysis of the actual specimen surface.

While the present invention is beneficial for use in any AFM application, there are several applications in which the invention is particularly suited. For example, the present invention is useful in measuring the quality of thin dielectric films (less than 150 Å or 15 nm) such as those used in semiconductor devices and integrated circuits. Also, the present invention is useful for characterizing thin film deposition processes, and particularly for measuring discontinuous films (e.g. films on a substrate which have not been deposited for a sufficient time to entirely cover the substrate). Furthermore, the present invention is also particularly well-suited for measuring unpatterned surfaces in contrast to using AFM to measure patterned dimensions. For example, measuring roughness of a blanket insulating or polysilicon layer, rather than measure interconnect line widths or trenches. However, the present invention may be used to measure patterned surfaces as well. For example, the present invention may be used to measure critical dimensions in a semiconductor fabrication operation, wherein a sample wafer is pulled from a production line and the critical dimensions of that wafer are measured in accordance with the present invention as a monitor or gauge of the critical dimensions of other wafers running through the production line. The present invention is also very applicable to measuring surfaces where the surface features are extremely small, for instance where the vertical dimensions of the surface features are less than 100 Å (5 nm), or where the surface has a RMS roughness of less than 50 Å (5 nm). As evident from the examples above, the present invention is applicable to both process development and manufacturing processes, wherein surface topography measurements may be used to adjust manufacturing processes (either in-line or off-line).

Thus it is apparent that there has been provided, in accordance with the invention, a process for measuring surface topography using atomic force microscopy that fully meets the need and advantages set forth previously. Although the invention has been described and illustrated with reference to specific embodiments thereof, it is not intended that the invention be limited to these illustrative embodiments. Those skilled in the art will recognize that modifications and variations can be made without departing from the spirit of the invention. For example, the surface to be measured is not limited to an insulating or dielectric surface despite the fact that AFM was developed for such use. Conductive layers, such as polysilicon, tungsten, aluminum, and other conductive materials used in semiconductor fabrication may also be measured using this technique. In addition, the invention is not limited to silicon or silicon nitride probe tips which are coated with carbon, although silicon and silicon nitride are the most commonly used probe tip materials. It is also important to note that the present invention is not limited in any way to a particular type of specimen to be measured. Nor is the invention limited to a particular carbon thickness, as such thickness may depend on the type of specimen being measured. Nor is the invention limited to a particular method of carbon coating or to a particular form of carbon (e.g. diamond, amorphous, graphite). Therefore, it is intended that this invention encompass all such variations and modifications as fall within the scope of the appended claims.

We claim:

1. A process for measuring surface topography using atomic force microscopy, comprising the steps of:
   providing a specimen having a surface;
   providing an atomic force microscopy probe having a probe tip, wherein the probe tip is externally coated with a film of carbon;
   bringing the carbon coated probe tip into contact with the surface of the specimen; and
   scanning the surface with the carbon coated probe tip to generate an image of the surface topography, wherein the probe tip intentionally contacts the surface of the specimen during the step of scanning.

2. The process of claim 1 wherein the step of providing a probe comprises providing a silicon probe tip.

3. The process of claim 1 wherein the step of providing a probe comprises providing a silicon nitride probe tip.

4. The process of claim 1 wherein the step of providing a probe comprises providing a probe tip wherein the carbon film is between approximately 100–3000 angstroms thick.

5. The process of claim 1 wherein the step of providing a specimen comprises providing a silicon substrate.

6. The process of claim 1 wherein the step of providing a specimen comprises providing a specimen having an insulating surface as the surface to be measured.

7. The process of claim 6 wherein the step of providing a specimen comprises providing a specimen wherein the insulating surface is a surface comprising silicon.

8. The process of claim 1 wherein the step of scanning the surface further comprises simultaneously tapping the probe tip into and out of contact with the surface.

9. The process of claim 1 wherein the step of scanning the surface comprises continuously pressing the probe tip against the specimen surface during scanning.

10. The process of claim 1 wherein the step of providing a specimen comprises providing a specimen wherein the surface has a root mean square roughness of less than 50 angstroms.

11. A process for measuring surface topography using atomic force microscopy, comprising the steps of:
    providing a semiconductor substrate having an overlying layer of material, wherein the layer of material has a surface;
    providing an atomic force microscopy probe having a probe tip with carbon coating;
    contacting the surface of the layer of material with the probe tip such that the carbon coating is directly in contact with the surface of the layer of material; and
    scanning the surface of the layer of material with the probe tip in contact with the surface to create an image of the surface topography of the layer of material, wherein the probe tip intentionally contacts the surface of the specimen during the step of scanning.

12. The process of claim 11 wherein the step of providing a semiconductor substrate comprises providing a semiconductor substrate wherein the overlying layer of material is an insulating layer.

13. The process of claim 12 wherein the step of providing a semiconductor substrate comprises providing a semiconductor substrate having an overlying layer of material having a thickness of less than approximately 150 angstroms.

14. The process of claim 11 wherein the step of providing a semiconductor substrate comprises providing a semiconductor substrate wherein the surface of the layer of material has a root mean square roughness of less than 50 angstroms.

15. The process of claim 11 wherein the step of providing a semiconductor substrate comprises providing a plurality of semiconductor wafers each having a critical dimension, and further comprising the steps of selecting a wafer from the plurality of wafers and measuring the critical dimension of the selected wafer using the carbon coated probe tip to monitor the critical dimensions of the plurality of wafers.

16. The process of claim 11 wherein the step of scanning comprises scanning the surface of the layer of material while repeatedly bringing the probe tip into and out of contact with the surface of the layer of material.

17. The process of claim 16 wherein the step of providing a probe comprises providing a probe having a silicon probe tip.

18. The process of claim 11 wherein the step of providing a probe comprises providing a probe having a silicon probe tip.

19. The process of claim 11 wherein the step of providing a probe comprises providing a probe having a silicon nitride probe tip.

20. A process for measuring surface topography using atomic force microscopy, comprising the steps of:
providing a specimen having a surface;
providing an atomic force microscopy system having a cantilever probe with a probe tip formed near an end of the cantilever probe;
coating the probe tip with carbon;
bringing the carbon coated probe tip into contact with the surface of the specimen;
scanning the surface with the probe tip; and
detecting the deflection of the cantilever probe as the surface is scanned to generate a representative image of the surface topography.

21. The process of claim 20 wherein the step of coating comprises evaporating a layer of carbon on the probe tip.

22. The process of claim 20 wherein the step of coating comprises coating the probe tip with a layer of carbon having a thickness approximately in the range of 100–3000 angstroms.

23. The process of claim 20 wherein the step of providing a probe tip comprises providing a silicon probe tip.

24. The process of claim 20 further comprising the step of tapping the probe tip against the surface of the layer of material during the step of scanning.

25. The process of claim 20 the step of providing a specimen comprises providing a specimen wherein the surface is an insulating surface.

26. The process of claim 20 the step of providing a specimen comprises providing a semiconductor substrate.

27. The process of claim 20 wherein the step of providing a specimen comprises providing a specimen wherein the surface has a root mean square roughness of less than 50 angstroms.

28. The process of claim 20 further comprising the step of coating the cantilever probe with carbon simultaneously with the step of coating the probe tip with carbon.

* * * * *